(12) United States Patent
Franz et al.

(10) Patent No.: US 10,781,364 B2
(45) Date of Patent: Sep. 22, 2020

(54) ELECTROCHROMIC MEDIA AND DEVICES WITH MULTIPLE COLOR STATES

(71) Applicant: Gentex Corporation, Zeeland, MI (US)

(72) Inventors: Sue F. Franz, Zeeland, MI (US); Kelvin L. Baumann, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 515 days.

(21) Appl. No.: 15/789,802

(22) Filed: Oct. 20, 2017

(65) Prior Publication Data
US 2018/0112127 A1    Apr. 26, 2018

Related U.S. Application Data

(60) Provisional application No. 62/410,709, filed on Oct. 20, 2016.

(51) Int. Cl.
| | |
|---|---|
| *C09K 9/02* | (2006.01) |
| *G02F 1/153* | (2006.01) |
| *E06B 9/24* | (2006.01) |
| *G02F 1/1503* | (2019.01) |
| *G02F 1/1514* | (2019.01) |
| *B60J 3/00* | (2006.01) |
| *B60R 1/08* | (2006.01) |
| *G02F 1/1339* | (2006.01) |

(52) U.S. Cl.
CPC ............ *C09K 9/02* (2013.01); *E06B 9/24* (2013.01); *G02F 1/1503* (2019.01); *G02F 1/1533* (2013.01); *B60J 3/007* (2013.01); *B60R 1/088* (2013.01); *C09K 2211/1018* (2013.01); *C09K 2211/1022* (2013.01); *E06B 2009/2464* (2013.01); *G02F 1/1339* (2013.01); *G02F 2001/15145* (2019.01)

(58) Field of Classification Search
CPC . C09K 9/02; G02F 1/1533; G02F 2001/1512; E06B 9/24
See application file for complete search history.

(56) References Cited

U.S. PATENT DOCUMENTS

| | | | |
|---|---|---|---|
| 4,297,401 | A | 10/1981 | Chern et al. |
| 4,418,102 | A | 11/1983 | Ferrato |
| 4,695,490 | A | 9/1987 | McClelland et al. |
| 4,902,108 | A | 2/1990 | Byker |
| 5,140,455 | A | 8/1992 | Varaprasad et al. |
| 5,596,023 | A | 1/1997 | Tsubota et al. |
| 5,596,024 | A | 1/1997 | Horie et al. |
| 5,818,625 | A | 10/1998 | Forgette et al. |
| 5,888,431 | A | 3/1999 | Tonar et al. |

(Continued)

OTHER PUBLICATIONS

International Search Report and Written Opinion, PCT/US2017/057705, GENTEX21 dated Feb. 2018).

*Primary Examiner* — Bijan Ahvazi
(74) *Attorney, Agent, or Firm* — Foley & Lardner LLP; Bradley D. Johnson

(57) ABSTRACT

An electrochromic medium includes a solvent, a first pair of a first anodic material and a first cathodic material, and at least one of a second anodic material and a second cathodic material. At least one of the first anodic material and the first cathodic material is an electrochromic absorbing in the visible range, and at least one of the second anodic material and the second cathodic material is electrochromic absorbing in the visible range.

19 Claims, 3 Drawing Sheets

(56) References Cited

U.S. PATENT DOCUMENTS

| | | | |
|---|---|---|---|
| 5,940,201 A | 8/1999 | Ash et al. | |
| 5,998,617 A | 12/1999 | Srinivasa et al. | |
| 6,057,956 A | 5/2000 | Ash et al. | |
| 6,137,620 A | 10/2000 | Guarr et al. | |
| 6,141,137 A * | 10/2000 | Byker | C07D 213/22 359/265 |
| 6,157,480 A | 12/2000 | Anderson et al. | |
| 6,188,505 B1 | 2/2001 | Lomprey et al. | |
| 6,193,912 B1 | 2/2001 | Thieste et al. | |
| 6,207,292 B1 * | 3/2001 | Berneth | C09K 9/02 428/583 |
| 6,268,950 B1 | 7/2001 | Ash et al. | |
| 6,597,489 B1 | 7/2003 | Guarr et al. | |
| 6,635,194 B2 | 10/2003 | Kloeppner et al. | |
| 6,700,692 B2 | 3/2004 | Tonar et al. | |
| 6,714,334 B2 | 3/2004 | Tonar | |
| 7,372,611 B2 | 5/2008 | Tonar et al. | |
| 8,928,966 B1 | 1/2015 | Kloeppner et al. | |
| 2002/0015214 A1 | 2/2002 | Nishikitani et al. | |
| 2008/0055701 A1 * | 3/2008 | Liu | C07D 493/04 359/266 |
| 2013/0182308 A1 * | 7/2013 | Guarr | G02F 1/1533 359/275 |
| 2016/0377946 A1 | 12/2016 | Baumann | |
| 2017/0146880 A1 | 5/2017 | Baumann et al. | |

* cited by examiner

ELECTROCHROMIC MEDIA AND DEVICES WITH MULTIPLE COLOR STATES

CROSS-REFERENCE TO RELATED APPLICATIONS

This application claims the benefit of U.S. Provisional Patent Application No. 62/410,709, filed on Oct. 20, 2016, the entire disclosure of which is incorporated herein by reference for any and all purposes.

FIELD

The present technology relates generally to the field of electrochromic materials. More specifically, the present technology provides electrochromic media that exhibit a transparent state without an applied potential, and at least two different colored states depending on the applied potential. The present technology also provides devices incorporating the electrochromic media.

SUMMARY

In an aspect, an electrochromic medium is provided that includes a solvent, a first pair of a first anodic and a first cathodic material, and at least one of a second anodic material and a second cathodic material. At least one of the first anodic material and the first cathodic material is an electrochromic exhibiting a first absorption maxima in the visible range; at least one of the second anodic material and the second cathodic material is electrochromic exhibiting a second absorption maxima in the visible range different than the first absorption maxima, provided that should only one of the second anodic material or the second cathodic material be present, the one that is present in the electrochromic medium is electrochromic exhibiting the second absorption maxima. In the electrochromic medium, a difference between the absolute value of the first redox potential of the first anodic material and the absolute value of the first redox potential of the second anodic material is greater than 0. Similarly, a difference between the absolute value of the first redox potential of the first cathodic material and the absolute value of the first redox potential of the second cathodic material is greater than 0. The electrochromic medium may be configured to provide that the first absorption maxima but not the second absorption maxima are exhibited upon application of a potential to the electrochromic medium that is less than the absolute value of the first redox potential of the at least one of the second anodic material and the second cathodic material that is electrochromic. The difference between the absolute value of the first redox potential of the first anodic material and the absolute value of the first redox potential of the second anodic material may be at least about 110 mV and the difference between the absolute value of the first redox potential of the first cathodic material and the absolute value of the first redox potential of the second cathodic material may be at least about 110 mV. The solvent employed may include a protic solvent, an aprotic solvent, or combinations thereof.

DETAILED DESCRIPTION

Figure 1:
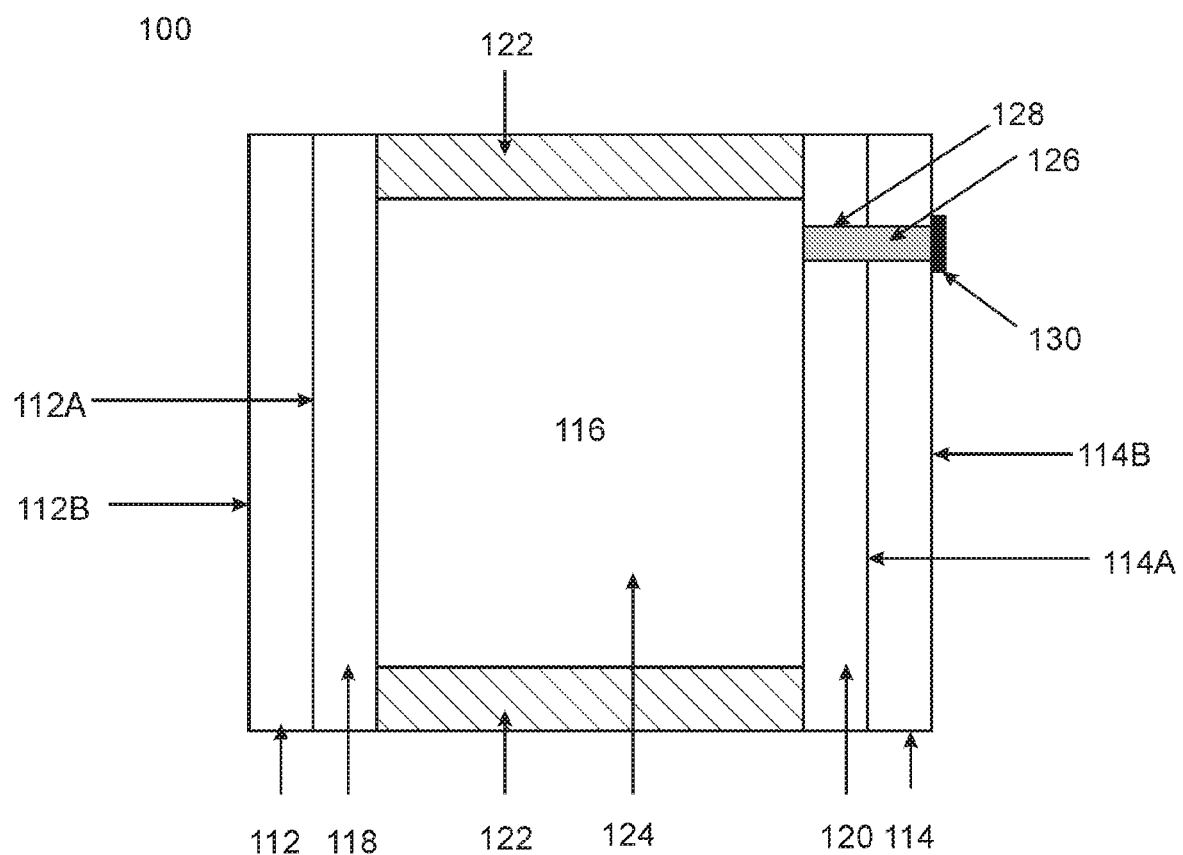
FIG. 1 is a cross-sectional schematic representation of an electrochromic device, according to one embodiment.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$ and $S^{35}$ are thus within the scope of the present technology. Procedures for inserting such labels into the compounds of the present technology will be readily apparent to those skilled in the art based on the disclosure herein.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, $C_m$-$C_n$, such as $C_1$-$C_{12}$, $C_1$-$C_8$, or $C_1$-$C_6$ when used before a group refers to that group containing m to n carbon atoms.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C≡CHCH$_3$.

Alkynyl groups include straight and branched chain alkyl groups as defined above, except that at least one triple bond exists between two carbon atoms. Alkynyl groups may be substituted or unsubstituted. Alkynyl groups have from 2 to 12 carbon atoms, and typically from 2 to 10 carbons or, in some embodiments, from 2 to 8, 2 to 6, or 2 to 4 carbon atoms. In some embodiments, the alkynyl group has one, two, or three carbon-carbon triple bonds. Examples include, but are not limited to —C≡CH, —C≡CCH$_3$, —CH$_2$C≡CCH$_3$, —C≡CCH$_2$CH(CH$_2$CH$_3$)$_2$, among others. Representative substituted alkynyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups may be substituted or unsubstituted. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. The phrase "aryl groups" includes groups containing fused rings, such as fused aromatic-aliphatic ring systems (e.g., indanyl, tetrahydronaphthyl, and the like). Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. Aralkyl groups may be substituted or unsubstituted. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. Heterocyclyl groups may be substituted or unsubstituted. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be monosubstituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups may be substituted or unsubstituted. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. The phrase "heteroaryl groups" includes fused ring compounds. Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Heterocyclylalkyl groups may be substituted or unsubstituted. Substituted heterocyclylalkyl groups may be substituted at the alkyl, the heterocyclyl or both the alkyl and heterocyclyl portions of the group. Representative heterocyclyl alkyl groups include, but are not limited to, morpholin-4-yl-ethyl, furan-2-yl-methyl, imidazol-4-yl-methyl, pyridin-3-yl-methyl, tetrahydrofuran-2-yl-ethyl, and indol-2-yl-propyl. Representative substituted heterocyclylalkyl groups may be substituted one or more times with substituents such as those listed above.

Heteroaralkyl groups are alkyl groups as defined above in which a hydrogen or carbon bond of an alkyl group is replaced with a bond to a heteroaryl group as defined above. Heteroaralkyl groups may be substituted or unsubstituted. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to using the "ene" designation. Thus, e.g., chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Alkoxy groups may be substituted or unsubstituted. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups may be substituted one or more times with substituents such as those listed above.

The term "carboxylate" as used herein refers to a —C(O)O⁻ group.

The term "ester" as used herein refers to —COOR$^{170}$. R$^{170}$ is a substituted or unsubstituted alkyl, cycloalkyl, alkenyl, alkynyl, aryl, aralkyl, heterocyclylalkyl or heterocyclyl group as defined herein.

The term "nitrile" or "cyano" as used herein refers to the —CN group.

The term "amine" (or "amino") as used herein refers to —NR$^{175}$R$^{176}$ groups, wherein R$^{175}$ and R$^{176}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "sulfonamido" includes S- and N-sulfonamide groups, i.e., —SO$^2$NR$^{178}$R$^{179}$ and —NR$^{178}$SO$_2$R$^{179}$ groups, respectively. R$^{178}$ and R$^{179}$ are independently at each occurrence hydrogen, or a substituted or unsubstituted alkyl, alkenyl, alkynyl, cycloalkyl, aryl, aralkyl, heterocyclylalkyl, or heterocyclyl group as defined herein. Sulfonamido groups therefore include but are not limited to sulfamoyl groups (—SO$_2$NH$_2$). In some embodiments herein, the sulfonamido is —NHSO$_2$-alkyl and is referred to as the "alkylsulfonylamino" group.

The term "thiol" refers to —SH groups, while "sulfides" include —SR$^{180}$ groups, "sulfoxides" include —S(O)R$^{181}$ groups, "sulfones" include —SO$_2$R$^{182}$ groups, and "sulfonyls" include —SO$_2$OR$^{183}$. R$^{180}$, R$^{181}$, R$^{182}$, R$^{133}$ are each independently a substituted or unsubstituted alkyl, cycloalkyl, alkenyl, alkynyl, aryl, aralkyl, heterocyclyl or heterocyclylalkyl group as defined herein. In some embodiments the sulfide is an alkylthio group, —S-alkyl. "Sulfonates" refer to —SO$_2$O⁻ groups.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O⁻. A "hydroxyalkyl" group is a hydroxyl-substituted alkyl group, such as HO—CH$_2$—.

The term "imide" refers to —C(O)NR$^{198}$C(O)R$^{199}$, wherein R$^{198}$ and R$^{199}$ are each independently hydrogen, or a substituted or unsubstituted alkyl, cycloalkyl, alkenyl, alkynyl, aryl, aralkyl, heterocyclyl or heterocyclylalkyl group as defined herein.

The term "imine" refers to —CR$^{200}$ (NR$^{201}$) and —N(CR$^{200}$R$^{201}$) groups, wherein R$^{200}$ and R$^{201}$ are each independently at each occurrence hydrogen or a substituted or unsubstituted alkyl, cycloalkyl, alkenyl, alkynyl, aryl, aralkyl, heterocyclyl or heterocyclylalkyl group as defined herein, with the proviso that R$^{200}$ and R$^{201}$ are not both simultaneously hydrogen.

The term "phosphonate" as used herein refers to —P(O)(OR$^{202}$)O$^-$, wherein R$^{202}$ is a lone pair of electrons (i.e., OR$^{202}$=O$^-$), hydrogen, or a substituted or unsubstituted alkyl, cycloalkyl, alkenyl, alkynyl, aryl, aralkyl, heterocyclyl or heterocyclylalkyl group as defined herein.

The term "phosphate" as used herein refers to —O—P(O)(OR$^{203}$)O$^-$, wherein R$^{203}$ is a lone pair of electrons (i.e., OR$^{203}$=O$^-$), hydrogen, or a substituted or unsubstituted alkyl, cycloalkyl, alkenyl, alkynyl, aryl, aralkyl, heterocyclyl or heterocyclylalkyl group as defined herein.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to using the "ene" designation. Thus, e.g., chloroethyl is not referred to herein as chloroethylene.

The term "substantially void" or "substantially free" as used herein means the indicated component is present in an amount less than about 0.1 weight percent (wt %) of the composition.

The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows an eye-weighted transmittance (CIE 1964 10° Standard Observer, Y) of about 50% or more for a beam of light (CIE D65) directed to the material at a specular angle of 10°. In any embodiment herein including the term, substantially transparent may therefore mean the material allows an eye-weighted transmittance (CIE 1964 10° Standard Observer, Y) for a beam of light (CIE D65) directed to the material at a specular angle of 10° of about 50%, about 55%, about 60%, about 65%, about 70%, about 75%, about 80%, about 85%, about 90%, about 95%, about 98%, about 99%, about 99.9%, or any range including and/or in between any two of these values.

The terms "visible range", "visible light," and "visible light spectrum" as used herein refers to the portion of the electromagnetic spectrum that is visible to the typical human eye and will be understood by persons of ordinary skill in the art. If there are uses of the term(s) which are not clear to persons of ordinary skill in the art, given the context in which it is used, the term(s) means electromagnetic radiation in the range from about 380 nm to about 700 nm.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as a mixture of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

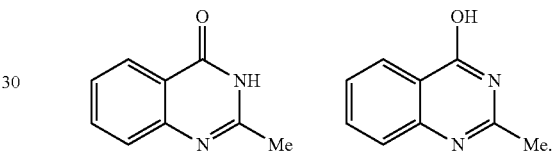

As another example, guanidines may exhibit the following isomeric forms in protic organic solution, also referred to as tautomers of each other:

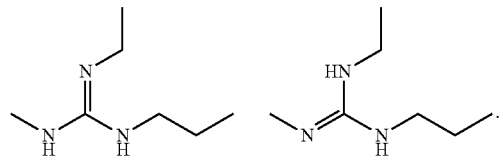

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

The Present Technology

Multi-state electrochromic media and devices thereof have been identified and are described herein that exhibit excellent switching from a substantially transparent state to a first colored state and then further to a second colored state at appropriately applied potentials. Whereas electrochromic devices typically exhibit one colored state throughout a range of applied potentials, the present technology is directed at electrochromic media and devices thereof designed to exhibit two or more distinct color transitions. Thus, the present technology provides electrochromic devices where it may be desirable to have more than one color, such as e.g., an automobile sun-visor, an automobile window, an automobile sun roof, a light filter for a display, and a display itself, where different colors are required for day time and night time applications, or for different light conditions at differing periods of time during the day and/or night.

In an aspect, an electrochromic medium is provided that includes a solvent, a first pair of a first anodic and a first cathodic material, and at least one of a second anodic material and a second cathodic material. At least one of the first anodic material and the first cathodic material is an electrochromic exhibiting a first absorption maxima in the visible range; at least one of the second anodic material and the second cathodic material is electrochromic exhibiting a second absorption maxima in the visible range different than the first absorption maxima, provided that should only one of the second anodic material or the second cathodic material be present, the one that is present in the electrochromic medium is electrochromic exhibiting the second absorption maxima. In the electrochromic medium, a difference between the absolute value of the first redox potential of the first anodic material and the absolute value of the first redox potential of the second anodic material is greater than 0. Similarly, a difference between the absolute value of the first redox potential of the first cathodic material and the absolute value of the first redox potential of the second cathodic material is greater than 0. The electrochromic medium may be configured to provide that the first absorption maxima but not the second absorption maxima are exhibited upon application of a potential to the electrochromic medium that is less than the absolute value of the first redox potential of the at least one of the second anodic material and the second cathodic material that is electrochromic. The difference between the absolute value of the first redox potential of the first anodic material and the absolute value of the first redox potential of the second anodic material may be at least about 110 mV and the difference between the absolute value of the first redox potential of the first cathodic material and the absolute value of the first redox potential of the second cathodic material may be at least about 110 mV. The solvent employed may include a protic solvent, an aprotic solvent, or combinations thereof. The electrochromic medium may be configured to provide that a first color upon application of a potential to the electrochromic medium that is less than the absolute value of the first redox potential of the at least one of the second anodic material and the second cathodic material that is electrochromic, and a second color upon application of a potential to the electrochromic medium that is about or above the first redox potential of the at least one of the second anodic material and the second cathodic material that is electrochromic.

A person of ordinary skill in the art readily understands and is fully enabled to determine the redox potentials of anodic and cathodic materials, where it is to be understood that for the present technology determination of the redox potentials of anodic and cathodic materials is performed such that anodic materials provide a positive redox value (e.g., 100 mV) and cathodic materials provide a negative redox value (e.g., −100 mV). For example, such redox potentials may be determined versus $Ag/Ag^+$.

By a material that is "electrochromic exhibiting an absorption maxima in the visible range," "electrochromic and exhibits a first absorption maxima in the visible range," or "an electrochromic absorbing in the visible range" (or similar phrases), it is to be understood that upon application of a potential about or above the first redox potential of the material (but prior to reaching a second redox potential for the material, if present) the material absorbs in the visible light spectrum, but absent application of a potential the material allows an eye-weighted transmittance (CIE 1964 10° Standard Observer, Y) for a beam of visible light (CIE D65) directed to the material at a specular angle of 10° of about 75%, about 80%, about 85%, about 90%, about 95%, about 99%, about 99.9%, about 100%, or any range including and/or in between any two of these values. Accordingly and as readily understood by one of ordinary skill in the art, an "absorption maxima in the visible range" refers to the highest absorption wavelength in the visible light spectrum without regard to portions of the electromagnetic spectrum that are outside the visible light spectrum.

In determining the difference between the absolute value of, for example, the redox potential for one cathodic material in comparison to another, the difference is always calculated to provide a positive mV value. The lowest absolute value redox potential for a material is termed the "first" redox potential, where the second lowest absolute value redox potential is terms the "second" redox potential, and so on.

The absorption spectrum of the first pair at the first redox potentials of the first anodic and/or first cathodic materials may be different than absorption spectrum of the at least one of the second anodic material and the second cathodic material at the first redox potentials of the second anodic and/or second cathodic materials. Such electrochromic media may exhibit one color at one applied potential (e.g., about or above the first redox potential of the first anodic and/or first cathodic materials) and a different color at another applied potential (e.g., about or above the first redox potential of the second anodic material and/or the second cathodic material).

In any embodiment herein, it may be the second anodic material exhibits an absorption maxima in the visible range (a "second absorption maxima" with respect to the collective anodic materials that are electrochromic) different from the first absorption maxima of the first anodic material. It may be that the first anodic material exhibits a first redox potential and a second redox potential, where the absolute value of the second redox potential is greater than the absolute value of the first redox potential, the first anodic material is electrochromic and exhibits the first absorption maxima in the visible range, and the absolute value of the second redox potential of the first anodic material is greater than the absolute value of the first redox potential of the second anodic material.

In any embodiment herein, it may be the second cathodic material exhibits a second absorption maxima in the visible range different from the first absorption maxima (of the first cathodic material). It may be that the first cathodic material exhibits a first redox potential and a second redox potential, where the absolute value of the second redox potential is greater than the absolute value of the first redox potential, the first cathodic material is electrochromic and exhibits the first absorption maxima in the visible range, and the absolute value of the second redox potential of the first cathodic material is greater than the absolute value of the first redox potential of the second cathodic material.

The electrochromic medium may further include at least one of a third anodic material and a third cathodic material.

A difference between the absolute value of the first redox potential of the first anodic material and the absolute value of a first redox potential of the third anodic material is at least 220 mV, and a difference between the absolute value of the first redox potential of the second anodic material and the absolute value of the first redox potential of the third anodic material is at least 110 mV. Similarly, a difference between the absolute value of the first redox potential of the first cathodic material and the absolute value of a first redox potential of the third cathodic material is at least 220 mV, and a difference between the absolute value of the first redox potential of the second cathodic material and the absolute value of the first redox potential of the third cathodic material is at least 110 mV. At least one of the third anodic material and the third cathodic material is electrochromic and exhibits a third absorption maxima in the visible range different from the first absorption maxima and the second absorption maxima—provided that should only one of the third anodic material or the third cathodic material be present in the electrochromic media, that the material present in the electrochromic media exhibits the third absorption maxima. Thus, the electrochromic medium including at least one of the third anodic material and the third cathodic material may exhibit three different colors at three different applied potentials.

In any embodiment herein, it may be the third anodic material that exhibits a third absorption maxima in the visible range different from the first absorption maxima (of the first anodic material) and the second absorption maxima (of the second anodic material). It may be that the first anodic material exhibits a first redox potential and a second redox potential where the absolute value of the second redox potential is greater than the absolute value of the first redox potential, the first anodic material is electrochromic and exhibits the first absorption maxima in the visible range, and the absolute value of the second redox potential of the first anodic material is greater than the absolute value of the first redox potential of the third anodic material.

In any embodiment herein, it may be the third cathodic material that exhibits a third absorption maxima in the visible range different from the first absorption maxima (of the first cathodic material) and the second absorption maxima (of the second cathodic material). It may be the first cathodic material exhibits a first redox potential and a second redox potential where the absolute value of the second redox potential is greater than the absolute value of the first redox potential, the first cathodic material is electrochromic and exhibits the first absorption maxima in the visible range, and the absolute value of the second redox potential of the first cathodic material is greater than the absolute value of the first redox potential of the third cathodic material. It may be the third anodic material and the third cathodic material each independently exhibit a third absorption maxima.

In any embodiment herein, electrochromic medium may include a second pair of the second anodic and the second cathodic material, where in the electrochromic medium a difference between the absolute value of the redox potential of the first pair and the absolute value of the redox potential of the second pair is at least about 110 mV. In determining the difference between one pair of anodic and cathodic materials to another pair, the lowest absolute value redox potential of a material is used from one pair to compare with the lowest absolute value redox potential of a material from the other pair. The difference is always calculated to provide a positive mV value.

The absorption spectrum of the first pair at the redox potentials of the first anodic and first cathodic materials may be different than absorption spectrum of the second pair at the redox potentials of the second anodic and second cathodic materials. Such a composition may exhibit one color at one applied potential and a different color at another applied potential.

In any embodiment herein, it may be the difference between absolute values of the redox potential of the first anodic material and a redox potential of the first cathodic material is no more than about 2000 mV. Thus, the difference between absolute values of the redox potential of the first anodic material and a redox potential of the first cathodic material may be about 2000 mV, about 1900 mV, about 1800 mV, about 1700 mV, about 1600 mV, about 1500 mV, about 1400 mV, about 1300 mV, about 1200 mV, about 1100 mV, about 1000 mV, about 900 mV, about 800 mV, about 700 mV, about 600 mV, about 500 mV, about 450 mV, about 400 mV, about 350 mV, about 300 mV, about 280 mV, about 260 mV, about 240 mV, about 220 mV, about 200 mV, about 190 mV, about 180 mV, about 170 mV, about 160 mV, about 150 mV, about 140 mV, about 130 mV, about 120 mV, about 110 mV, about 100 mV, about 90 mV, about 80 mV, about 70 mV, about 60 mV, about 50 mV, about 40 mV, about 30 mV, about 20 mV, about 10 mV, or any range including and/or in between any two of these values. In any embodiment herein, it may be that the difference between absolute values of the redox potential of the first anodic material and a redox potential of the first cathodic material is less than about 10 mV. When both the second anodic material and the second cathodic material are included in the electrochromic medium, the difference between absolute value of the redox potential of the second anodic material and the absolute value of the redox potential of the second cathodic material may be no more than about 2000 mV. Thus, the difference between absolute values of the redox potential of the second anodic material and the redox potential of the second cathodic material may independently be about 2000 mV, about 1900 mV, about 1800 mV, about 1700 mV, about 1600 mV, about 1500 mV, about 1400 mV, about 1300 mV, about 1200 mV, about 1100 mV, about 1000 mV, about 900 mV, about 800 mV, about 700 mV, about 600 mV, about 500 mV, about 450 mV, about 400 mV, about 350 mV, about 300 mV, about 280 mV, about 260 mV, about 240 mV, about 220 mV, about 200 mV, about 190 mV, about 180 mV, about 170 mV, about 160 mV, about 150 mV, about 140 mV, about 130 mV, about 120 mV, about 110 mV, about 100 mV, about 90 mV, about 80 mV, about 70 mV, about 60 mV, about 50 mV, about 40 mV, about 30 mV, about 20 mV, about 10 mV, or any range including and/or in between any two of these values. In any embodiment herein, it may be that the difference between absolute value of the redox potential of the second anodic material and the absolute value of the redox potential of the second cathodic material is less than about 10 mV.

The difference between the absolute values of the redox potential of the first anodic material and the redox potential of the second anodic material is at least about 110 mV, and may be about 110 mV, about 120 mV, about 130 mV, about 140 mV, about 150 mV, about 160 mV, about 170 mV, about 180 mV, about 190 mV, about 200 mV, about 220 mV, about 240 mV, about 260 mV, about 280 mV, about 300 mV, about 350 mV, about 400 mV, or any range including and/or in between any two of these values, or greater than any one of these values. Similarly, a difference between the absolute values of the redox potential of the first cathodic material and the redox potential of the second cathodic material may independently be about 110 mV, about 120 mV, about 130 mV, about 140 mV, about 150 mV, about 160 mV, about 170 mV, about 180 mV, about 190 mV, about 200 mV, about 220 mV, about 240 mV, about 260 mV, about 280 mV, about 300 mV, about 350 mV, about 400 mV, or any range including and/or in between any two of these value, or greater than any one of these values. The difference between the absolute values of the redox potentials of the first pair and the second pair may be at least about 110 mV, and may be about 110 mV, about 120 mV, about 130 mV, about 140 mV, about 150 mV, about 160 mV, about 170 mV, about 180 mV, about 190 mV, about 200 mV, about 220 mV, about 240 mV, about 260 mV, about 280 mV, about 300 mV, about 350 mV, about 400 mV, about 450 mV, or any range including and/or in between any two of these values, or greater than any one of these values.

The electrochromic medium may further include a third pair of a third anodic material and a third cathodic material. In this third pair, a difference between the absolute values of the redox potentials of the third pair and the first pair is at least about 220 mV (or any range or subrange as discussed for the first and second pair above); a difference between the absolute values of the redox potentials of the third pair and the second pair is at least about 110 mV (or any range or subrange as discussed for the first and second pair above); and at least one of the third anodic material and the third cathodic material is electrochromic absorbing in the visible range. Similar to the first and second pairs, it may be a difference between an absolute values of a redox potential of the third anodic material and an absolute value of a redox potential of the third cathodic material is no more than about 110 mV (or any range or subrange as discussed for the first anodic and first cathodic materials above). Absorption spectrum of the third pair at the redox potentials of the third anodic and third cathodic materials may be different than the absorption spectrum of the first pair at the redox potentials of the first anodic and first cathodic materials and may be different than the absorption spectrum of the second pair at the redox potentials of the second anodic and second cathodic materials. Thus, the electrochromic medium including such a third pair may exhibit three different colors at three different applied potentials.

Protic solvents as used herein include, but are not limited to, alcohols (e.g., methanol ($CH_3OH$), ethanol (EtOH), isopropanol (iPrOH), trifluoroethanol (TFE), butanol (BuOH), ethylene glycol, propylene glycol), carboxylic acids (e.g., formic acid, acetic acid, propanoic acid, butanoic acid, pentanoic acid, lauric acid, stearic acid, deoxycholic acid, glutamic acid, glucuronic acid), ammonia ($NH_3$), a primary amino compound (e.g., methyl amine, ethyl amine, propyl amine), a secondary amino compound (e.g., dimethyl amine, diethyl amine, di(n-propyl) amine), water, or a mixture of any two or more thereof. Thus, in any of the above embodiments and aspects, the protic solvent may include an alcohol, a carboxylic acid, a primary amino compound, a secondary amino compound, water, or a mixture of any two or more thereof. In any of the above embodiments and aspects, the protic solvent may include a diol. In any of the above embodiments and aspects, the protic solvent may include water. The amount of protic solvent in the electrochromic medium may be about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, about 98 wt %, about 99 wt %, about 100 wt %, or any range including and/or in between any two of these values.

An aprotic solvent as used herein includes, but is not limited to, a carbonate, a halogenated solvent, an ether, an ester, a ketone, a tertiary amide, a nitrile, a sulfoxide, a sulfone, or a mixture of any two or more thereof. In any of the above embodiments and aspects, the aprotic solvent may be a polar aprotic solvent. Polar aprotic solvents as used herein include halogenated solvents (e.g., methylene chloride ($CH_2Cl_2$), chloroform ($CHCl_3$), benzotrifluoride (BTF; $PhCF_3$)), ethers (e.g., tetrahydrofuran (THF), 2-methyltetrahydrofuran (2Me-THF), dimethoxyethane (DME), dioxane), esters (e.g., ethyl acetate, isopropyl acetate), ketones (e.g., acetone, methylethyl ketone, methyl isobutyl ketone), carbonates (e.g., ethylene carbonate, propylene carbonate, trimethylene carbonate), amides (e.g., dimethylformamide (DMF), dimethylacetamide (DMA)), nitriles (e.g., acetonitrile ($CH_3CN$), propionitrile ($CH_3CH_2CN$), benzonitrile (PhCN)), sulfoxides (e.g., dimethyl sulfoxide), sulfones (e.g., sulfolane), or a mixture of any two or more thereof. In any of the above embodiments and aspects, the aprotic solvent may include a cyclic carbonate such as ethylene carbonate, propylene carbonate, butylene carbonate, trimethylene carbonate, 2,2-dimethyltrimethylene carbonate, a cyclic ester such as α-acetolactone, β-propiolactone, γ-butyrolactone, γ-valerolactone, δ-valerolactone, γ-caprolactone, δ-caprolactone, ε-caprolactone, or a combination of any two or more thereof. In any of the above embodiments and aspects, the amount of aprotic solvent may be about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, about 98 wt %, about 99 wt %, about 100 wt %, or any range including and/or in between any two of these values.

In any embodiment herein, the electrochromic medium may be solid state, solution phase, a gel, or a polymer-based material such as an electrochromic thermoplastic material or a cross-linked material. Representative electrochromic thermoplastics include those described in U.S. patent application Ser. No. 15/065,730, incorporated herein by reference in its entirety. The electrochromic medium may be gelled or solidified in situ. Gelling may help to prevent movement of the electrochromic medium within a device and/or leakage from the device in the event of breakage. Illustrative electrochromic media are those as described in U.S. Pat. Nos. 4,902,108; 5,888,431; 5,940,201; 6,057,956; 6,268,950, 6,635,194, and 8,928,966, and U.S. Patent Application Publication No. 2002/0015214.

Each anodic material and each cathodic material (collectively, "electroactive materials") may each independently be present in the electrochromic medium in a concentration of about 1 millimolar (mM) to the solubility limit in the electrochromic medium. The concentration of each electroactive material in the electrochromic medium may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, about 55 mM, about 60 mM, about 65 mM, about 70 mM, about 75 mM, about 80 mM, about 85 mM, about 90 mM, about 95 mM, about 100 mM, or any range including and/or in between any two of these values. The concentration of the electrochromic anodic and cathodic materials may be selected as taught in U.S. Pat. No. 6,137,620.

As described above, at least one of the first anodic material and the first cathodic material is an electrochromic absorbing in the visible range, at least one of the second anodic material and the second cathodic material is electrochromic absorbing in the visible range, and (when present) at least one of the third anodic material and the third cathodic material is electrochromic absorbing in the visible range. Cathodic electrochromic materials include, but are not limited to, those described in U.S. Pat. Nos. 4,902,108; 5,998,617; and 6,193,912; and U.S. patent application Ser. No. 15/065,808. The cathodic material may include a 4,4'-bipyridinium compound and/or a 2,2'-bipyridinium compound. In any of the above embodiments and aspects, the 4,4'-bipyridinium compound (also known as a viologen) may be represented by Formula (I) and the 2,2'-bipyridinium compound may be represented by Formula (X):

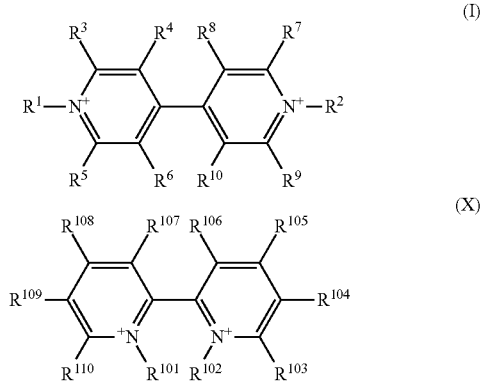

where in Formula (I)
  $R^1$ and $R^2$ are each independently an alkyl group substituted with a carboxylate, phosphonate, phosphate, or sulfonate;
  $R^3$, $R^4$, $R^5$, $R^6$, $R^7$, $R^8$, $R^9$, and $R^{10}$ are each independently H, $OR^{11}$, F, Cl, Br, I, CN, $NO_2$, alkyl, alkoxy, or aryl; and
  $R^{11}$ is H or alkyl; and
where in Formula (X)
  $R^{101}$ and $R^{102}$ are each independently an alkyl group substituted with a carboxylate, phosphonate, phosphate, or sulfonate;
  $R^{103}$, $R^{104}$, $R^{105}$, $R^{106}$, $R^{107}$, $R^{109}$, and $R^{110}$ are each independently H, $OR^{111}$, F, Cl, Br, I, CN, $NO_2$, alkyl, alkoxy, or aryl; and
  $R^{111}$ is H or alkyl.

In any of the above embodiments, the 4,4'-bipyridinium compound may be represented by Formula (III) or (IV):

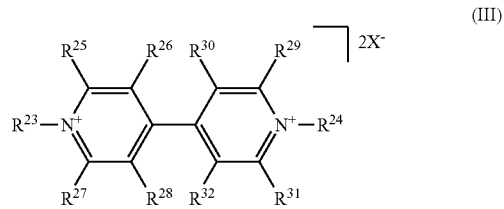

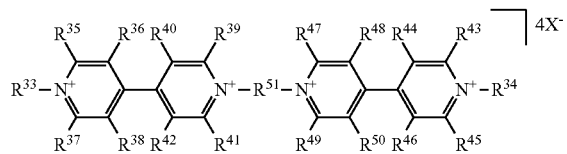

where in Formula (III)
  $R^{23}$ and $R^{24}$ are each independently alkyl, siloxy alkyl, hydroxyalkyl, alkenyl, or aralkyl;
  $R^{25}$, $R^{26}$, $R^{27}$, $R^{28}$, $R^{29}$, $R^{30}$, $R^{31}$, and $R^{32}$ are each independently H, OH, F, Cl, Br, I, CN, $NO_2$, alkyl, alkoxy, or aryl; and
  X is an anion; and
where in Formula (IV)
  $R^{33}$ and $R^{34}$ are each independently alkyl, siloxyalkyl, hydroxyalkyl, alkenyl, or aralkyl;
  $R^{35}$, $R^{36}$, $R^{37}$, $R^{38}$, $R^{39}$, $R^{40}$, $R^{41}$, $R^{42}$, $R^{43}$, $R^{44}$, $R^{45}$, $R^{46}$, $R^{47}$, $R^{48}$, $R^{49}$, and $R^{50}$ are each independently H, OH, F, Cl, Br, I, CN, $NO_2$, alkyl, alkoxy, or aryl;
  $R^{51}$ is $(CH_2)_{n'}$ or arylene;
  n' is from 1 to 12; and
  X is an anion.

In any of the above embodiments, the 2,2'-bipyridinium compound may be represented by Formula (XI)

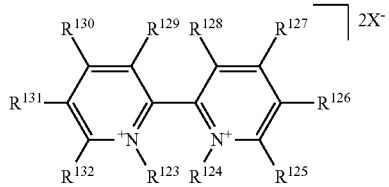

where in Formula (XI)
  $R^{123}$ and $R^{124}$ are each independently alkyl, siloxy alkyl, hydroxyalkyl, alkenyl, or aralkyl;
  $R^{125}$, $R^{126}$, $R^{127}$, $R^{128}$, $R^{129}$, $R^{130}$, $R^{131}$, and $R^{132}$ are each independently H, OH, F, Cl, Br, I, CN, $NO_2$, alkyl, alkoxy, or aryl; and
  X is an anion.

In any of the above embodiments, it may be the anion of Formulas (III), (IV), and/or (XI) is a halide, a borate, a fluoroborate, a tetraaryl borate, a hexafluoro metal or metalloid, a sulfate, a sulfonate, a sulfonamide, a carboxylate, a perchlorate, a tetrachloroferrate, or a mixture of any two or more thereof. In any of the above embodiments and aspects, the anion of Formulas (III), (IV), and/or (XI) may be F, Cl, Br, I, $BF_4$, $PF_6$, $SbF_6$, $AsF_6$, $ClO_4$, $N(CF_3SO_2)_2$, $C(CF_3SO_2)_3$, triflate, $N(SO_2C_2F_5)$, or $BAr_4$, wherein Ar is an aryl, fluorinated aryl, or a bis(trifluoromethyl)aryl group.

Anodic electrochromic materials may include, but are not limited to, those as illustrated in U.S. Pat. Nos. 4,902,108; 5,998,617; and 6,193,912, and U.S. patent application Ser. No. 15/065,808. In any of the above embodiments, the anodic material may include one or more of a phenazine, phenothiazine, a phenoxazine, a triphenodithiazine, a triphenodioxazine, a carbazole, a biscarbazole, an indolocarbazole, a benzoimidazoleazine, a benzothiazoleazine, a benzoxazoleazine, a ferrocene or combinations of any two or more thereof. In any of the above embodiments and aspects, the anodic material may include a compound represented by Formula (II)

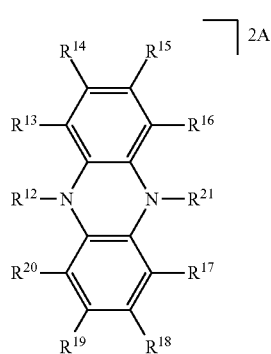

where $R^{12}$ and $R^{21}$ are each independently an alkyl group substituted with a carboxylate, phosphonate, phosphate, or sulfonate; $R^{13}$, $R^{14}$, $R^{15}$, $R^{16}$, $R^{17}$, $R^{18}$, $R^{19}$, and $R^{20}$ are each independently H, F, Cl, Br, I, CN, $OR^{22}$, $SR^{22}$, $NO_2$, alkyl, aryl, or amino (e.g., $-NR^{175}R^{176}$ where $R^{175}$ and $R^{176}$ are independently hydrogen, or an alkyl optionally interrupted by at least one ammonium group), or any two adjacent $R^{13}$, $R^{14}$, $R^{15}$, $R^{16}$, $R^{17}$, $R^{18}$, $R^{19}$, and $R^{20}$ join to form a monocyclic, polycyclic, or heterocyclic group; each $R^{22}$ is independently at each occurrence H or alkyl; and A is a cation. In any of the above embodiments, the anodic material may be a compound represented by Formula (V) or (VI):

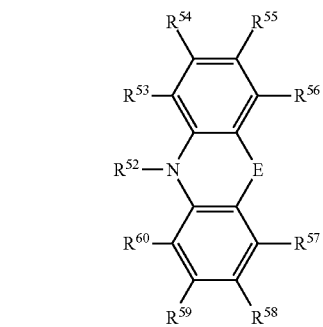

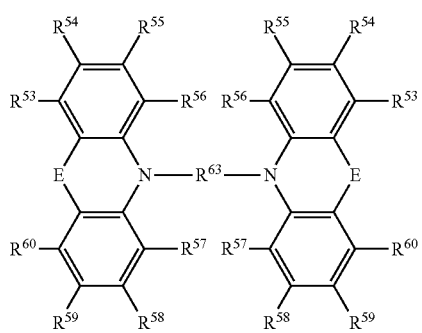

where E is independently at each occurrence O, S, or $NR^{61}$, $R^{52}$ and $R^{61}$ are each independently an alkyl group optionally interrupted by at least one ammonium group; $R^{53}$, $R^{54}$, $R^{55}$, $R^{56}$, $R^{57}$, $R^{58}$, $R^{59}$, and $R^{60}$ are each independently H, F, Cl, Br, I, CN, $OR^{62}$, $SR^{62}$, $NO_2$, alkyl, aryl, or amino (e.g., $-NR^{175}R^{176}$ where $R^{175}$ and $R^{176}$ are independently hydrogen, or an alkyl optionally interrupted by at least one ammonium group), or any two adjacent groups of $R^{53}$, $R^{54}$, $R^{55}$, $R^{56}$, $R^{57}$, $R^{58}$, $R^{59}$, and $R^{60}$ join to form a monocyclic, polycyclic, or heterocyclic group; each $R^{62}$ is independently at each occurrence H or alkyl; and $R^{63}$ is an alkylene group. In any of the above embodiments, the anodic material may be a compound represented by Formula (VII):

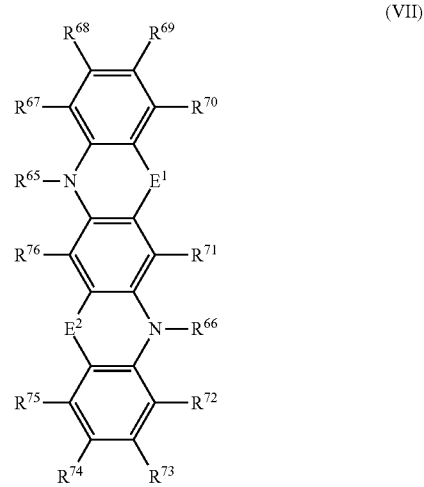

where $E^1$ and $E^2$ are each independently O, S, or $NR^{77}$; $R^{77}$, $R^{65}$, and $R^{66}$ are independently at each occurrence an alkyl group optionally interrupted by at least one ammonium group; $R^{67}$, $R^{68}$, $R^{69}$, $R^{70}$, $R^{71}$, $R^{72}$, $R^{73}$, $R^{74}$, $R^{75}$, and $R^{76}$ are each independently H, F, Cl, Br, I, CN, OH, SH, S-alkyl, $NO_2$, alkyl, alkoxy, aryl, or amino (e.g., $-NR^{175}R^{176}$ where $R^{175}$ and $R^{176}$ are independently hydrogen, or an alkyl optionally interrupted by at least one ammonium group), or any two adjacent groups of $R^{67}$, $R^{68}$, $R^{69}$, $R^{70}$, $R^{72}$, $R^{73}$, $R^{74}$, and $R^{75}$ join to form a monocyclic, polycyclic, or heterocyclic group.

An exemplary list of cathodic and anodic material classes, along with their approximate first redox potential and typical color (if present) when an applied potential is about or above the first redox potential (prior to reaching a second redox potential, if present), is provided below. Note that such approximate redox potentials are for illustrative purposes in regard to the indicated class of electrochromic material, and deviations are expected based on differing substituents and differing substitution patterns.

| Cathodic Material | Approx. First Redox (mV) | Visible Color in Reduced State |
| --- | --- | --- |
| N'N'-di-aryl viologens | −100 | Green |
| N-aryl N'-alkyl viologens | −200 | Blue/Green |
| alkyl-viologen-alkylene-viologen-alkyl materials (also known as diviolgens) | −200 | Purple |
| N,N'-di-alkyl viologens | −300 | Blue |
| N,N-ethylene bridged 2,2' dipyridiums | −250 | Colorless |
| 2,2',6-trimethyl-6'benzyl N,N' di-alkyl viologens | −360 | Blue |
| 2,2',6-trimethyl-6'-phenyl propyl N,N'-di-alkyl viologens | −450 | Blue |
| 2,2',6,6'-tetramethyl-N,N'-di-alkyl viologens | −500 | Blue |

| Anodic Material | Approx. First Redox (mV) | Visible Color in Oxidized State |
|---|---|---|
| Benzoimidazole azines | 100 | Blue |
| 2,7 substituted 5,10-dialkyl phenazines | 200 | Brown |
| 1,4 substituted or 1,6 substituted 5,10-di-alkyl phenazines | 160 | Yellow |
| N,N',N'',N'''-tetra-substituted phenylene diamines | 180 | Blue |
| tri-aryl amines (especially para substituted aryl derivatives) | 700 | Blue |
| 2,2''-N,N',N'',N''' tetra-alkyl bis-phenazines | 200 | Green/brown |
| N,N' di-alkyl triphenodioxazines | 210 | Blue |
| benzoimidazole benzothiazoleazines | 250 | Blue |
| 5,10-di-alkyl, 5,10-di-aryl, and 5,10-aryl-alkyl phenazines | 300 | Green |
| N-alkyl phenoxazines (especially para substituted aryl derivatives) | 460 | Blue |
| N-alkyl phenothiazines (especially para substituted aryl derivatives) | 350 | Blue/Green |
| N,N'-di-alkyl triphenodithiazines | 550 | Blue |

In any of the above embodiments, the electrochromic medium may include one or more of a redox buffer, an ultraviolet light ("UV") stabilizer, an oxygen scavenger, an antioxidant, a reductant, or combinations of any two or more thereof.

Redox buffers may include, but are not limited to, those as described in U.S. Pat. No. 6,188,505. Redox buffers may include, but are not limited to, ferrocenes such as ferrocene, octamethyl-dihexanol ferrocene, decamethyl ferrocene, or nonamethyl, methanol ferrocene. The concentration of each buffer in the electrochromic medium may each independently be from about 0.1 mM to about 10 mM. For example, ferrocene-type buffers and ferrocinium-type buffers are two types of redox buffers. Ferrocene-type buffers include, but are not limited to, octamethyl-dihexanol ferrocene; nonamethyl-methanol ferrocene; decamethyl ferrocene; di-tert-butyl-diethylferrocene, and 6-(tetra-tert-butylferrocenyl) hexyl) triethylammonium tetrafluoroborate. The concentration of each ferrocene-type buffer in the electrochromic medium may independently be from about 0.1 mM to about 10 mM for each ferrocene-type buffer. Ferrocinium-type buffers include, but are not limited to, octamethyl-dihexanol ferrocenium; nonamethyl-methanol ferrocenium; decamethyl ferrocenium and 6-(tetra-tert-butylferrocenium) hexyl)triethylammonium di-tetrafluoroborate. The concentration of each ferrocinium-type buffer in the electrochromic medium may independently be from about 0.1 mM to about 10 mM for each ferrocinium-type buffer.

UV stabilizers may include, but are not limited to, those as described in U.S. Pat. No. 5,140,455 and U.S. patent application Ser. No. 15/065,808. For example, UV stabilizers include, but are not limited to, oxybenzones and tinuvins. The concentration of each UV stabilizer in the electrochromic medium may be about 1 millimolar (mM) up to the solubility limit of the UV stabilizer in the electrochromic medium. The concentration of each UV stabilizer in the electrochromic medium may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, about 55 mM, about 60 mM, about 65 mM, about 70 mM, about 75 mM, about 80 mM, about 85 mM, about 90 mM, about 95 mM, about 100 mM, about 110 mM, about 120 mM, about 130 mM, about 140 mM, about 150 mM, about 160 mM, about 170 mM, about 180 mM, about 190 mM, about 200 mM, about 220 mM, about 240 mM, about 260 mM, about 280 mM, about 300 mM, or any range including and/or in between any two of these values.

Oxygen scavengers include, but are not limited to, D-isoascorbic acid. The concentration of each oxygen scavenger in the electrochromic medium may be from about 1 millimolar (mM) up to the solubility limit in the electrochromic medium. The concentration of each oxygen scavenger in the electrochromic medium may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and/or in between any two of these values.

Antioxidants include, but are not limited to, butylated hydroxytoluene (BHT), The concentration of each antioxidant in the electrochromic medium may be from about 1 millimolar (mM) up to the solubility limit in the electrochromic medium. The concentration of each antioxidant in the electrochromic medium may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and/or in between any two of these values.

Reductants include, but are not limited to, amines, hydroquinones. The concentration of each reductant in the electrochromic medium may be about 1 millimolar (mM) to about 50 mM. The concentration of each reductant in the electrochromic medium may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and/or in between any two of these values.

In an aspect, an electrochromic device is provided that includes the electrochromic medium of any one of the above embodiments. The electrochromic device includes at least one chamber defined by a first conductive surface of first substrate, a second conductive surface of a second substrate. The electrochromic medium is disposed within the chamber and may be according to any of the herein described embodiments of an electrochromic medium. The device may further include a sealing member joining the first substrate to the second substrate. The first and second substrates may be off-set to one another to allow for electric contact to be made with the first and second conductive surfaces. The conductive surface may include one or more layers of electrically conductive material. It is contemplated that the electrically conductive material may be fabricated from fluorine doped tin oxide (FTO), indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art. Several other electrochromic device configurations are contemplated for use, including, but not limited to, those disclosed in U.S. Pat. Nos. 5,818,625; 6,597,489; and 6,700,692, all of which are hereby incorporated herein by reference in their entirety including all references incorporated therein.

A schematic representation of one embodiment of an electrochromic device is shown in FIG. 1. The electrochromic device 100 includes first substrate 112 having a front surface 112B and a rear surface 112A, and a second substrate 114 having a front surface 114A and a rear surface 114B. The rear surface 112A and the front surface 114A have associated therewith conductive surfaces 118 and 120, respectively. The first substrate 112 and the second substrate 114, along with a sealing member 122 define a chamber 116 for containing an electrochromic medium 124. The device also includes one or more plugs 126 and 130 associated with one or more fill ports 128. The one or more fill ports 128 may be disposed within the first substrate 112, the second substrate 114, or the sealing member 122. Upon mounting as a mirror, window, or other device, the electrochromic device 100 may optionally include a bezel that extends around a periphery of at least one of the first substrate 112 and the second substrate 114 to conceal and/or protect a bus connector (if present), the sealing member 122, one or more plugs 126 and 130, and the one or more fill ports 128.

In any aspect including an electrochromic device, the first substrate may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g., PET), polyimides (PI), polycarbonates, polysulfones, polyethylene naphthalate (PEN), ethylene vinyl acetate (EVA), acrylate polymers, as well as Topas®. In another embodiment, the first substrate is fabricated from a sheet of glass having a thickness ranging from about 0.10 millimeters (mm) to about 12.7 mm. This may include any range of thickness such as from about 0.50 mm to about 1.50 mm, or from about 0.65 mm to about 1.00 mm. Of course, the thickness of the substrate will depend upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate and/or second substrate may comprise a UV absorbing layer and/or contain a UV absorbing material to help protect the substrate(s) and/or the electrochromic medium and/or electrochromic device from UV damage.

The second substrate may or may not be fabricated from similar materials as that of the first substrate, or where transparency of the second substrate is not desired, the second substrate may be a metal. The second substrate is fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates are fabricated from sheets of glass, then the glass can optionally be tempered, heat strengthened, chemically strengthened, and/or laminated prior to or subsequent to being coated with layers of electrically conductive material.

The first substrate may have a first surface (a "front" surface of the first substrate) and a second surface (a "rear" surface of the first substrate) where the second surface includes the first conductive surface. One or more layers of electrically conductive material may be associated with the second surface of the first substrate. These layers serve as an electrode for the electrochromic device. Electrically conductive material is desirably a material that: (a) is substantially transparent in the visible region of the electromagnetic spectrum; (b) bonds reasonably well to the first substrate; (c) maintains this bond when associated with a sealing member; (d) is generally resistant to corrosion from materials contained within the electrochromic device or the atmosphere; and (e) exhibits minimal diffuse or specular reflectance as well as sufficient electrical conductivity. It is contemplated that the electrically conductive material may be fabricated from fluorine doped tin oxide (FTO), indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art.

The second conductive surface of a second substrate may be a third surface (a "front" surface of the second substrate) and the second substrate may further include a fourth surface (a "rear" surface of the second substrate). One or more layers of an electrically conductive material made of the same or different materials as those associated with the second surface of the first substrate may be associated the third surface of the second substrate. The electrically conductive material may be operatively bonded to electrically conductive material associate with the first substrate by a sealing member. Once bonded, the sealing member, and/or the juxtaposed portions of electrically conductive materials may serve to generally define an inner peripheral geometry of a chamber. Alternatively, edge sealing techniques may be utilized which are disclosed in U.S. Pat. No. 7,372,611.

The sealing member may include any material that is configured to adhesively bond to the electrically conductive materials coated on the first and second substrate. It is also contemplated that the sealing member extends all the way to rear surface and front surface of their respective substrates. The layers of electrically conductive material coated on the first and second substrates may be partially removed where the sealing member is positioned. If the electrically conductive materials are not associated with their respective substrates, then the sealing member preferably bonds well to glass. It will be understood that sealing member can be fabricated from any one of a number of materials including, for example, those disclosed in U.S. Pat. Nos. 4,297,401; 4,418,102; 4,695,490; 5,596,023; 5,596,024; 6,157,480; and 6,714,334.

Illustrative electrochromic devices employing the electrochromic mediums described herein may include, for illustrative purposes only, a window, a sun visor, an aircraft transparency, a mirror, a display device, and the like. In some embodiments, the electrochromic device is an electrochromic window, an electrochromic sun visor, an electrochromic sun roof, or an electrochromic mirror. In some embodiments, the device is a vehicular sun visor, a vehicular window, or a vehicular sun roof. In some embodiments, the device is a variable transmission electrochromic window, a variable transmission electrochromic sun visor, or a variable transmission electrochromic sun roof. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards and the like.

The examples herein are provided to illustrate advantages of the present technology and to further assist a person of ordinary skill in the art with preparing or using the present technology. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

EXAMPLES

Example 1

Electrochromic Medium. To propylene carbonate was added the following components to generate the indicated final concentrations:
Compound A-1: 10 mM
Compound C-1: 10 mM
Compound A-2: 20 mM
Compound C-2: 20 mM
Decamethyl ferrocenium tetrafluroborate: 1 mM
Decamethyl ferrocene: 0.5 mM
Oxybenzone: 100 mM
1:10 2-hydroxyethyl methacrylate:methacrylate (HEMA:MA) copolymer: 5.5 wt % methylene diphenyl-2,4-diisocyanate (MDI): 0.375 wt % dibutyltin diacetate (DBTDA): 3 ppm
Compounds A-1, A-2, C-1, and C-2 are illustrated below.

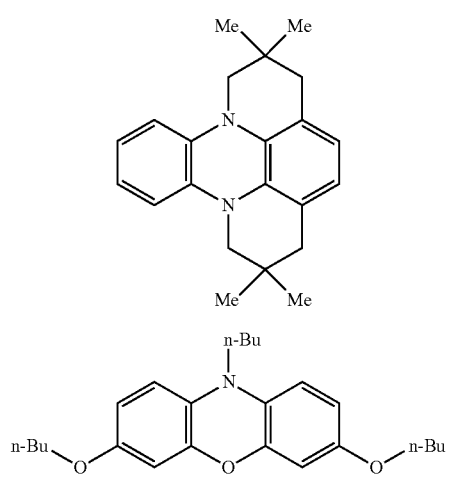

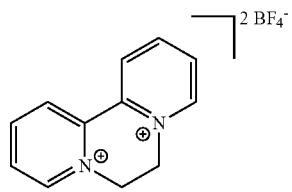

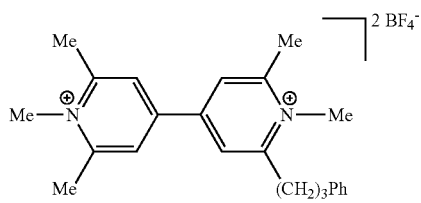

The redox potentials of each of these compounds versus Ag/Ag$^+$ is provided in the chart below, along with the differences in the absolute values of the indicated redox potentials.

| Compound | Redox E (mV) |
| --- | --- |
| A-1 | E1 = 194 |
|  | E2 = 921 |
| C-1 | E1 = −252 |
|  | E2 = −696 |
| A-2 | E1 = 460 |
|  | E2 = 1160 |
| C-2 | E1 = −492 |
|  | E2 = −848 |

The difference between the absolute values of the first redox potentials of the anodic electrochromic materials is $E1_{(A2)}-E1_{(A1)}=460-194=266$ mV. The difference between the absolute values of the first redox potentials of the cathodic electrochromic materials is $E1_{(C2)}-E1_{(C1)}=492-252=240$ mV. The difference between the lowest absolute value first redox potential of the A-1/C-1 pair and the lowest absolute value first redox potential A-2/C-2 pair is $E1_{(A2)}E1_{(C1)}=460-194=266$ mV. Furthermore, the absolute value of the second redox potential of A-1 (921 mV) is greater than the absolute value of the first redox potential of A-2 (460 mV), and the absolute value of the second redox potential of C-1 (696 mV) is greater than the absolute value of the first redox potential of C-2 (492 mV).

Example 2

Electrochromic Device. An electrochromic device was prepared that included the electrochromic medium of Example 1. The devices were constructed from two sheets of 0.95 mm soda lime glass, each of which were previously coated on one side with indium-tin oxide (ITO). An epoxy containing spacer beads was dispensed around the perimeter of one sheet (the "bottom" sheet) on top of the ITO coating. A small gap was left in the epoxy to act as a fill port after the epoxy is cured. The other sheet (the "top" sheet) was positioned with the ITO coated sides disposed towards the bottom sheet and with an offset to the bottom sheet allowing access and electrical contact to the conductive ITO coatings from the edges. The top sheet was pressed down on the epoxy to the spacer beads forming a cell 250 μm thick. The epoxy seal was thermally cured at a temperature appropriate for the seal and glass. The cell was filled with the electrochromic medium of Example 1 and the fill port was plugged using a UV curable epoxy. Busbars were applied to the offset edges producing a rigid electrochromic device with a thermally cured seal.

Example 3

Switchable Absorptions Provided by the Electrochromic Device of Example 2. The electrochromic device of Example 2 was subjected to various applied potentials from 0 V to 1.4 V. The current as a function of the applied potential for this device is provided in Table 1 and illustrated in FIG. 2. The light transmission as a function of the applied potential is provided in Table 2 and illustrated in FIG. 3. The change in color of the device in the CIE 1976 (L*, u*, V*) color space as adopted by International Commission on Illumination is provided in Table 3.

TABLE 1

| Applied Potential in Volts (V) | Current (in Amps) |
|---|---|
| 0 | 0.000257 |
| 0.05 | 0.001972 |
| 0.1 | 0.003368 |
| 0.15 | 0.004293 |
| 0.2 | 0.004624 |
| 0.25 | 0.005017 |
| 0.3 | 0.006212 |
| 0.35 | 0.008728 |
| 0.4 | 0.01256 |
| 0.45 | 0.017295 |
| 0.5 | 0.022017 |
| 0.55 | 0.0262 |
| 0.6 | 0.029295 |
| 0.65 | 0.03121 |
| 0.7 | 0.032266 |
| 0.75 | 0.032802 |
| 0.8 | 0.033287 |
| 0.85 | 0.033806 |
| 0.9 | 0.034924 |
| 0.95 | 0.037089 |
| 1 | 0.040857 |
| 1.05 | 0.046004 |
| 1.1 | 0.051911 |

TABLE 1-continued

| Applied Potential in Volts (V) | Current (in Amps) |
|---|---|
| 1.15 | 0.057848 |
| 1.2 | 0.063285 |
| 1.25 | 0.067813 |
| 1.3 | 0.071071 |
| 1.35 | 0.073036 |
| 1.4 | 0.074103 |

TABLE 2

| Applied Potential in Volts (V) | Transmittance (%) |
|---|---|
| 0 | 74.96828 |
| 0.05 | 74.90084 |
| 0.1 | 74.71455 |
| 0.15 | 74.53396 |
| 0.2 | 74.43242 |
| 0.25 | 74.31521 |
| 0.3 | 73.89124 |
| 0.35 | 72.78228 |
| 0.4 | 70.93041 |
| 0.45 | 68.65869 |
| 0.5 | 66.31323 |
| 0.55 | 64.20991 |
| 0.6 | 62.60571 |
| 0.65 | 61.55546 |
| 0.7 | 60.95521 |
| 0.75 | 60.59175 |
| 0.8 | 60.34753 |
| 0.85 | 60.04091 |
| 0.9 | 59.31651 |
| 0.95 | 57.08744 |
| 1 | 51.67089 |
| 1.05 | 42.50726 |
| 1.1 | 31.58675 |
| 1.15 | 21.69309 |
| 1.2 | 14.36591 |
| 1.25 | 9.655991 |
| 1.3 | 6.998955 |
| 1.35 | 5.637408 |
| 1.4 | 4.967145 |

TABLE 3

| Applied Potential in Volts (V) | CIE-X | CIE-Y | CIE-Z | u' | v' |
|---|---|---|---|---|---|
| 0 | 69.19674 | 74.96828 | 65.47579 | 0.199106 | 0.485354 |
| 0.05 | 69.06076 | 74.90084 | 64.93549 | 0.199111 | 0.485885 |
| 0.1 | 68.71704 | 74.71455 | 63.64518 | 0.199126 | 0.487138 |
| 0.15 | 68.40138 | 74.53396 | 62.48299 | 0.199151 | 0.488264 |
| 0.2 | 68.22845 | 74.43242 | 61.89819 | 0.199148 | 0.488826 |
| 0.25 | 68.03525 | 74.31521 | 61.27114 | 0.199141 | 0.489425 |
| 0.3 | 67.32844 | 73.89124 | 59.01466 | 0.199087 | 0.49161 |
| 0.35 | 65.48338 | 72.78228 | 53.43619 | 0.198807 | 0.497175 |
| 0.4 | 62.51962 | 70.93041 | 45.19792 | 0.19815 | 0.505815 |

TABLE 3-continued

| Applied Potential in Volts (V) | CIE-X | CIE-Y | CIE-Z | u' | v' |
|---|---|---|---|---|---|
| 0.45 | 59.08578 | 68.65869 | 36.60279 | 0.197154 | 0.515467 |
| 0.5 | 55.75247 | 66.31323 | 29.31534 | 0.195898 | 0.524263 |
| 0.55 | 52.9373 | 64.20991 | 23.99732 | 0.194608 | 0.53111 |
| 0.6 | 50.8846 | 62.60571 | 20.59733 | 0.193521 | 0.535721 |
| 0.65 | 49.58903 | 61.55546 | 18.68531 | 0.19277 | 0.538398 |
| 0.7 | 48.86552 | 60.95521 | 17.73543 | 0.192308 | 0.539745 |
| 0.75 | 48.43994 | 60.59175 | 17.21617 | 0.192038 | 0.540481 |
| 0.8 | 48.15469 | 60.34753 | 16.89289 | 0.191842 | 0.540939 |
| 0.85 | 47.80644 | 60.04091 | 16.57682 | 0.19158 | 0.541369 |
| 0.9 | 46.98656 | 59.31651 | 16.05746 | 0.190826 | 0.54203 |
| 0.95 | 44.49393 | 57.08744 | 15.04975 | 0.188144 | 0.543141 |
| 1 | 38.58691 | 51.67089 | 13.56325 | 0.180663 | 0.544324 |
| 1.05 | 29.15504 | 42.50726 | 11.77502 | 0.166105 | 0.544896 |
| 1.1 | 18.97217 | 31.58675 | 9.906868 | 0.145243 | 0.544084 |
| 1.15 | 11.00521 | 21.69309 | 8.106207 | 0.122036 | 0.541244 |
| 1.2 | 6.102211 | 14.36591 | 6.532088 | 0.101203 | 0.53607 |
| 1.25 | 3.518635 | 9.655991 | 5.283618 | 0.085711 | 0.529226 |
| 1.3 | 2.295093 | 6.998955 | 4.431078 | 0.07614 | 0.522429 |
| 1.35 | 1.745262 | 5.637408 | 3.925138 | 0.071176 | 0.517289 |
| 1.4 | 1.493051 | 4.967145 | 3.656088 | 0.068671 | 0.514029 |

Figure 2:
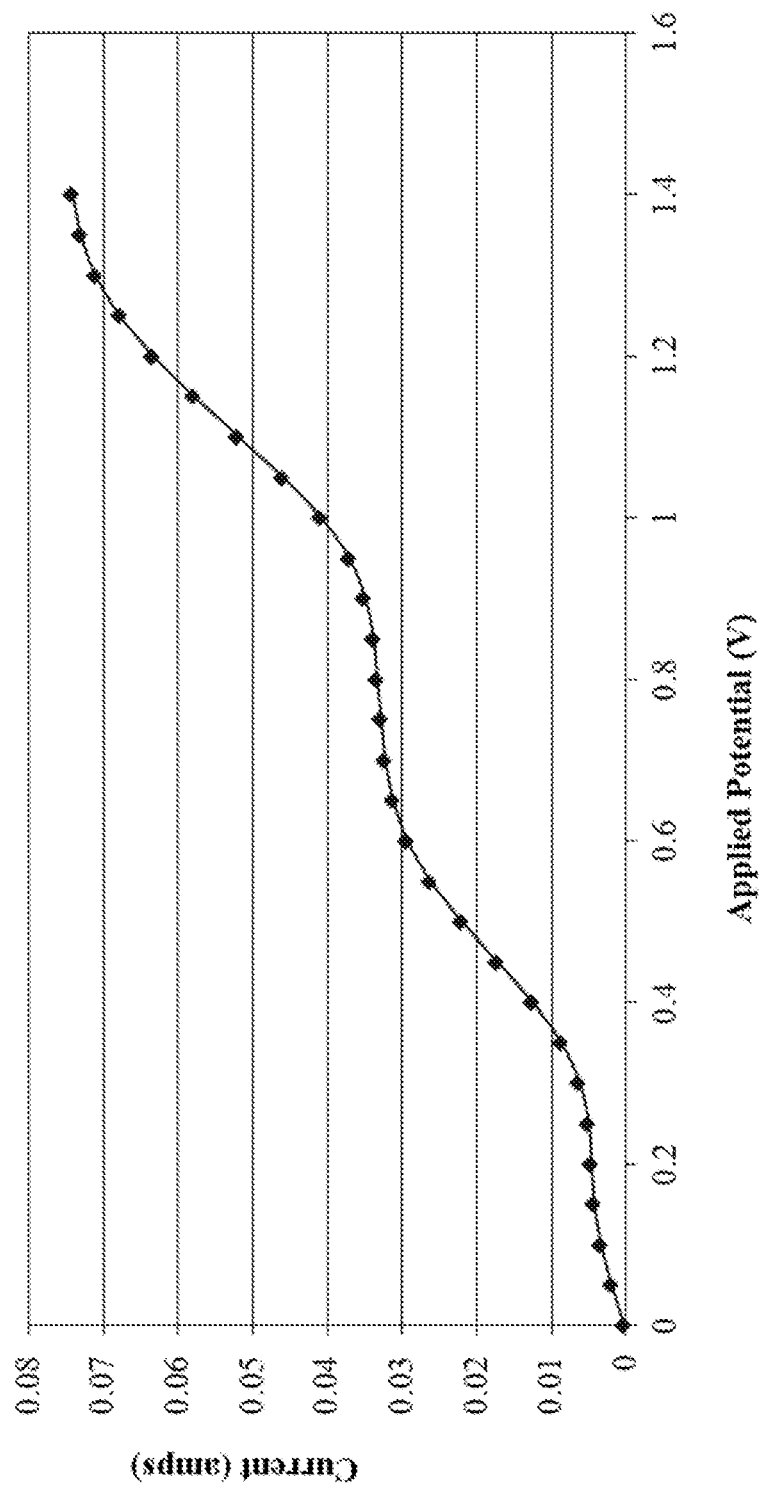
FIG. 2 illustrates the current as a function of the applied potential for electrochromic device of the present technology, according to the working examples.

As provided in Table 1 and illustrated in FIG. 2, the current increases fairly slowly until about 0.3 V, when the current increases more drastically until about 0.6V when the rate of increase slows. The rate of current increase then exhibits another drastic increase between about 0.9 V and about 1.2 V. These more drastic current increases correspond to the change in light transmission. As illustrated by Table 2 and FIG. 3, the transmission exhibits a more rapid decline between about 0.3 V and about 0.6 V, and a precipitous decline between about 0.9 V and about 1.2V.

Figure 3:
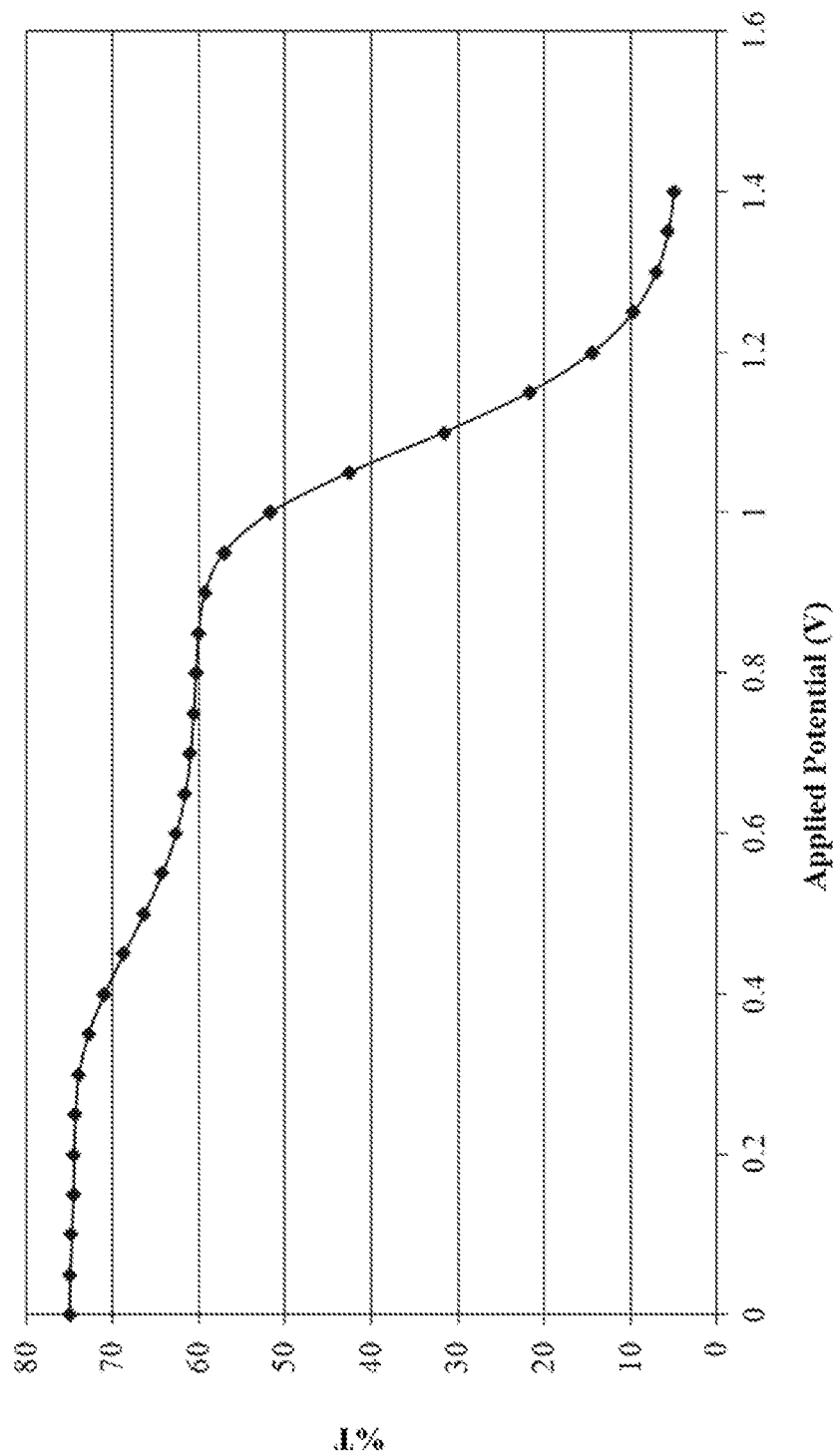
FIG. 3 illustrates the light transmission as a function of the applied potential for electrochromic device of the present technology, according to the working examples.

Table 3 illustrates that at about 0.3 V the device switches from a more transparent state to a yellow hue, where between about 0.3 V and about 0.6 V this yellow hue becomes more intense (see also FIG. 3). At about 0.9 V, the color switches to a dark green, where the intensity of this green increases with increasing potential between about 0.9 V and about 1.2V (see also FIG. 3).

Example 4

Additional electrochromic media A-E were prepared according to Example 1, with the same A-1 and C-1 compounds and concentrations as Example 1 where A-2 and C-2 were the replaced with the following compounds at the indicated concentrations:

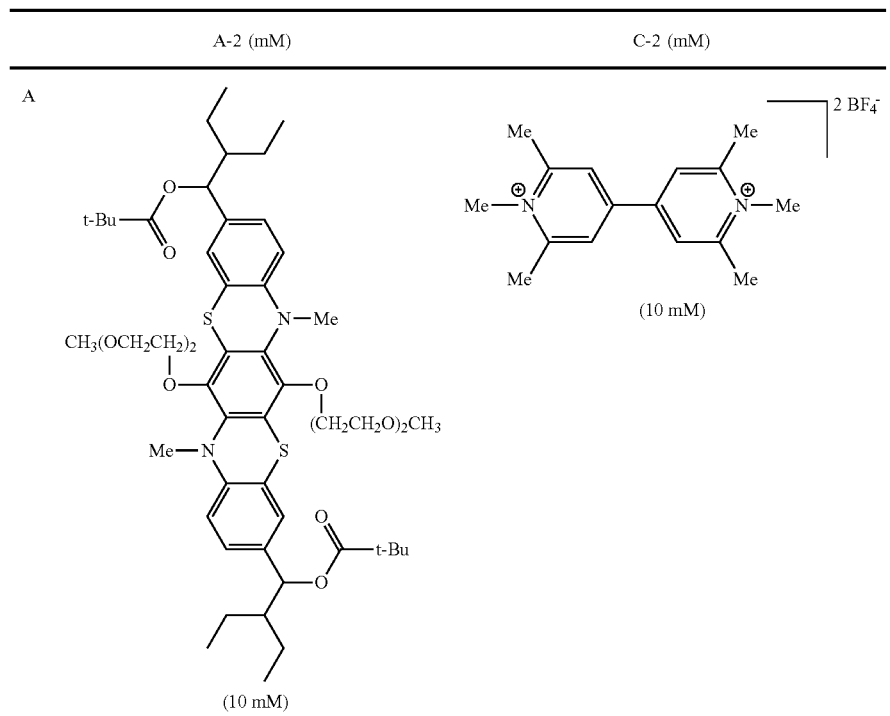

-continued

| A-2 (mM) | C-2 (mM) |
|---|---|
| B (structure: bis-benzothiazole azine with Cl substituents and N-Et groups) (10 mM) | Me-N⁺(pyridinium dimer with Me substituents)-Me  2 BF₄⁻ (10 mM) |
| C (structure: phenothiazine with N-Me and di(NEt₂) substituents) (10 mM) | Me-N⁺(pyridinium dimer with Me substituents)-Me  2 BF₄⁻ (10 mM) |
| D (structure: benzothiazole azine with Cl substituents, N-Et groups, and pendant Et₃N⁺Me · BF₄⁻ group) (10 mM) | Me-N⁺(pyridinium dimer with Me substituents)-Me  2 BF₄⁻ (10 mM) |
| E (structure: phenothiazine with N-Me and di(NEt₂) substituents) (20 mM) | Me-N⁺(pyridinium dimer with Me substituents)-Me  2 BF₄⁻ (20 mM) |

An electrochromic medium F was also prepared according to Example 1 with the same C-1, A-2, and C-2 compounds as Example 1, where C-1 was included at 10 mM, A-2 at 20 mM, and C-2 at 20 mM, and where the following compound

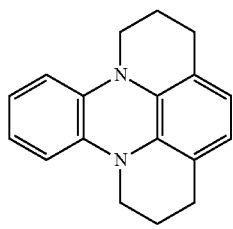 [SMILES: c1ccc2c(c1)N1CCCc3ccc4c(c31)N2CCC4]

was included as A-1 at a concentration of 10 mM.

Electrochromic media A-F were then each incorporated into separate electrochromic devices as described in Example 2 and tested in a similar fashion as described in Example 3. Each device exhibits two distinct color states at different applied potentials similar to the device described in Example 3.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. An electrochromic medium comprising:
   a solvent;
   a first pair of a first anodic and a first cathodic material; and
   at least one of a second anodic material and a second cathodic material
   wherein
      a difference between the absolute value of a first redox potential of the first anodic material and the absolute value of a first redox potential of the second anodic material is at least about 150 mV;
      a difference between the absolute value of a first redox potential of the first cathodic material and the absolute value of a first redox potential of the second cathodic material is at least about 150 mV;
      at least one of the first anodic material and the first cathodic material is electrochromic and exhibits a first absorption maxima in the visible range; and
      at least one of the second anodic material and the second cathodic material is electrochromic and exhibits a second absorption maxima in the visible range different from the first absorption maxima, with the proviso that should only one of the second anodic material or the second cathodic material be present, that one exhibits the second absorption maxima.

B. The electrochromic medium of Paragraph A, wherein absorption spectrum of the first pair is different than absorption spectrum of the at least one of the second anodic material and the second cathodic material.

C. The electrochromic medium of Paragraph A or Paragraph B, comprising the second anodic material that exhibits a second absorption maxima in the visible range different from the first absorption maxima; wherein
   the first anodic material exhibits a first redox potential and a second redox potential, where the absolute value of the second redox potential of the first anodic material is greater than the absolute value of the first redox potential of the first anodic material;
   the first anodic material is electrochromic and exhibits the first absorption maxima in the visible range; and
   the absolute value of the second redox potential of the first anodic material is greater than the absolute value of the first redox potential of the second anodic material.

D. The electrochromic medium of any one of Paragraphs A-C, comprising the second cathodic material that exhibits a second absorption maxima in the visible range different from the first absorption maxima; wherein
the first cathodic material exhibits a first redox potential and a second redox potential, where the absolute value of the second redox potential of the first cathodic material is greater than the absolute value of the first redox potential of the first cathodic material;
the first cathodic material is electrochromic and exhibits the first absorption maxima in the visible range; and
the absolute value of the second redox potential of the first cathodic material is greater than the absolute value of the first redox potential of the second cathodic material.

E. The electrochromic medium of any one of Paragraphs A-D, further comprising at least one of a third anodic material and a third cathodic material; wherein
a difference between the absolute value of the first redox potential of the first anodic material and the absolute value of a first redox potential of the third anodic material is at least about 300 mV, and a difference between the absolute value of the first redox potential of the second anodic material and the absolute value of the first redox potential of the third anodic material is at least about 150 mV;
a difference between the absolute value of the first redox potential of the first cathodic material and the absolute value of a first redox potential of the third cathodic material is at least about 300 mV, and a difference between the absolute value of the first redox potential of the second cathodic material and the absolute value of the first redox potential of the third cathodic material is at least about 150 mV;
at least one of the third anodic material and the third cathodic material is electrochromic and exhibits a third absorption maxima in the visible range different from the first absorption maxima and the second absorption maxima, with the proviso that should only one of the third anodic material or the third cathodic material is present, that one exhibits the third absorption maxima.

F. The electrochromic medium of Paragraph E, comprising the third anodic material that exhibits an absorption maxima in the visible range different from the first absorption maxima and the second absorption maxima; wherein
the first anodic material exhibits a first redox potential and a second redox potential, where the absolute value of the second redox potential is greater than the absolute value of the first redox potential;
the first anodic material is electrochromic and exhibits the first absorption maxima in the visible range; and
the absolute value of the second redox potential of the first anodic material is greater than the absolute value of the first redox potential of the third anodic material.

G. The electrochromic medium of Paragraph E or Paragraph F, comprising the third cathodic material that exhibits an absorption maxima in the visible range different from the first absorption maxima and the second absorption maxima; wherein
the first cathodic material exhibits a first redox potential and a second redox potential, where the absolute value of the second redox potential is greater than the absolute value of the first redox potential;
the first cathodic material is electrochromic and exhibits the first absorption maxima in the visible range; and
the absolute value of the second redox potential of the first cathodic material is greater than the absolute value of the first redox potential of the third cathodic material.

H. The electrochromic medium of any one of Paragraphs A-G, wherein the electrochromic medium comprises:
the first pair of the first anodic and the first cathodic material;
a second pair of the second anodic and the second cathodic material;
wherein
a difference between the absolute value of the redox potential of the first pair and the absolute value of the redox potential of the second pair is at least about 150 mV; and
at least one of the second anodic material and the second cathodic material is electrochromic and exhibits a second absorption maxima in the visible range different from the first absorption maxima.

I. The electrochromic medium of Paragraph H, wherein absorption spectrum of the first pair is different than absorption spectrum of the second pair.

J. The electrochromic medium of Paragraph H or Paragraph I, wherein
a difference between the absolute value of a first redox potential of the first anodic material and the absolute value of a first redox potential of the first cathodic material is no more than about 1000 mV; and
a difference between absolute value of the first redox potential of the second anodic material and the absolute value of the first redox potential of the second cathodic material is no more than about 1000 mV.

K. The electrochromic medium of any one of Paragraphs H-J, further comprising a third pair of a third anodic material and a third cathodic material; wherein
a difference between the absolute value of the redox potential of the third pair and the absolute value of the redox potential of the first pair is at least about 300 mV;
a difference between the absolute values of the redox potential of the third pair and the absolute value of the redox potential of the second pair is at least about 150 mV; and
at least one of the third anodic material and the third cathodic material is electrochromic and exhibits a third absorption maxima in the visible range, optionally different from the first absorption maxima and the second absorption maxima.

L. The electrochromic medium of Paragraph K, wherein absorption spectrum of the third pair is different than the absorption spectrum of the first pair and is different than the absorption spectrum of the second pair.

M. The electrochromic medium of any one of Paragraphs A-L, wherein the first anodic material comprises a phenazine, phenothiazine, a phenoxazine, a triphenodithiazine, a triphenodioxazine, a carbazole, a biscarbazole, an indolocarbazole, a benzoimidazoleazine, a benzothiazoleazine, a benzoxazoleazine, or a ferrocene.

N. The electrochromic medium of any one of Paragraphs A-M, wherein the second anodic material comprises a phenazine, phenothiazine, a phenoxazine, a triphenodithiazine, a triphenodioxazine, a carbazole, a biscarbazole, an indolocarbazole, a benzoimidazoleazine, a benzothiazoleazine, a benzoxazoleazine, or a ferrocene.

O. The electrochromic medium of any one of Paragraphs E-N, wherein the third anodic material comprises a phenazine, phenothiazine, a phenoxazine, a triphenodithiazine, a triphenodioxazine, a carbazole, a biscarbazole, an indolocarbazole, a benzoimidazoleazine, a benzothiazoleazine, a benzoxazoleazine, or a ferrocene.

P. The electrochromic medium of any one of Paragraphs A-O, wherein the first cathodic material comprises a 4,4'-bipyridinium compound.

Q. The electrochromic medium of any one of Paragraphs A-P, wherein the second cathodic material comprises a 4,4'-bipyridinium compound.

R. The electrochromic medium of any one of Paragraphs E-Q, wherein the third cathodic material comprises a 4,4'-bipyridinium compound.

S. The electrochromic medium of any one of Paragraphs A-R, wherein the first anodic material is

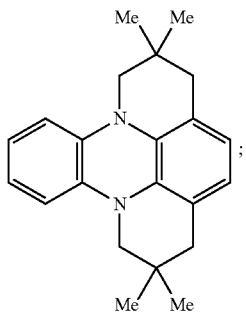 [SMILES: CC1(C)Cc2ccc3c4c2N(C1)c1ccccc1N4CC(C)(C)C3]

and
the first cathodic material is

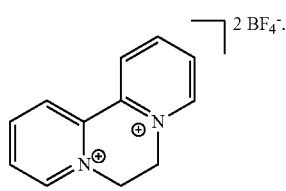 [SMILES: c1cc[n+]2c(c1)-c1cccc[n+]1CC2]

T. The electrochromic medium of any one of Paragraphs A-S, wherein
the second anodic material is

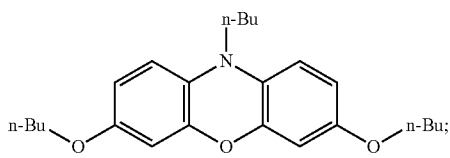

and/or
the second cathodic material is

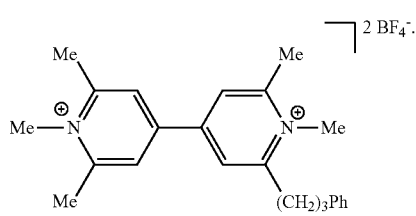

U. The electrochromic medium of any one of Paragraphs A-T, wherein the solvent comprises a carbonate, a halogenated solvent, an ether, an ester, a ketones, an tertiary amide, a nitrile, a sulfoxide, a sulfone, or a mixture of any two or more thereof.

V. The electrochromic medium of any one of Paragraphs A-U, wherein the solvent comprises a cyclic carbonate, a cyclic ester, or a combination thereof.

W. The electrochromic medium of any one of Paragraphs A-V, wherein the solvent comprises an alcohol, a carboxylic acid, a primary amino compound, a secondary amino compound, or a mixture of any two or more thereof.

X. The electrochromic medium of any one of Paragraphs A-W, wherein electrochromic medium is a solid state, solution phase, a gel, an electrochromic thermoplastic, or a cross-linked material.

Y. An electrochromic device comprising:
the electrochromic medium of any one of claims Paragraphs A-X; and
a chamber defined by a first conductive surface of first substrate, a second conductive surface of a second substrate, and a sealing member joining the first substrate to the second substrate,
wherein the electrochromic medium is disposed within the chamber.

Z. The electrochromic device of Paragraph Y which is an electrochromic window, an electrochromic sun visor, or an electrochromic mirror.

AA. The electrochromic device of Paragraph Y or Paragraph Z, wherein the first conductive surface comprises a transparent conductive oxide, carbon nanotubes, graphene, a conductive polymer, a conductive nanowire coating, a conductive metal mesh, or an insulator/metal/insulator stack (IMI stack).

AB. The electrochromic device of any one of Paragraphs Y-AA, wherein the first conductive surface comprises indium tin oxide, indium zinc oxide, carbon nanotubes, graphene, or poly(3,4-ethylenedioxythiophene) polystyrene sulfonate (PEDOT-PSS).

AC. The electrochromic device of any one of Paragraphs Y-AB, wherein the second conductive surface comprises a transparent conductive oxide, carbon nanotubes, graphene, a conductive polymer, a conductive nanowire coating, a conductive metal mesh, or an insulator/metal/insulator stack (IMI stack).

AD. The electrochromic device of any one of Paragraphs Y-AC, wherein the second conductive surface comprises indium tin oxide, indium zinc oxide, carbon nanotubes, graphene, or poly(3,4-ethylenedioxythiophene) polystyrene sulfonate (PEDOT-PSS).

Other embodiments are set forth in the following claims, along with the full scope of equivalents to which such claims are entitled.

What is claimed is:
1. An electrochromic medium comprising:
a solvent;
a first pair of a first anodic material and a first cathodic material; and
a second anodic material, a second cathodic material, or both the second anodic material and the second cathodic material;
wherein
a difference between the absolute value of a first redox potential of the first anodic material and the absolute value of a first redox potential of the second anodic material is greater than 0;
a difference between the absolute value of a first redox potential of the first cathodic material and the abso- lute value of a first redox potential of the second cathodic material is greater than 0;

at least one of the first anodic material and the first cathodic material is electrochromic and exhibits a first absorption maxima in the visible range; and at least one of the second anodic material and the second cathodic material is electrochromic and exhibits a second absorption maxima in the visible range different from the first absorption maxima, with the proviso that should only one of the second anodic material or the second cathodic material be present, that one exhibits the second absorption maxima;

configured to provide that the first absorption maxima but not the second absorption maxima is exhibited upon application of a potential to the electrochromic medium that is less than the absolute value of the first redox potential of the second anodic material and the second cathodic material that is electrochromic;

wherein at least one of the first cathodic material and the second cathodic material comprises a compound of Formula I, III, IV, X, or XI:

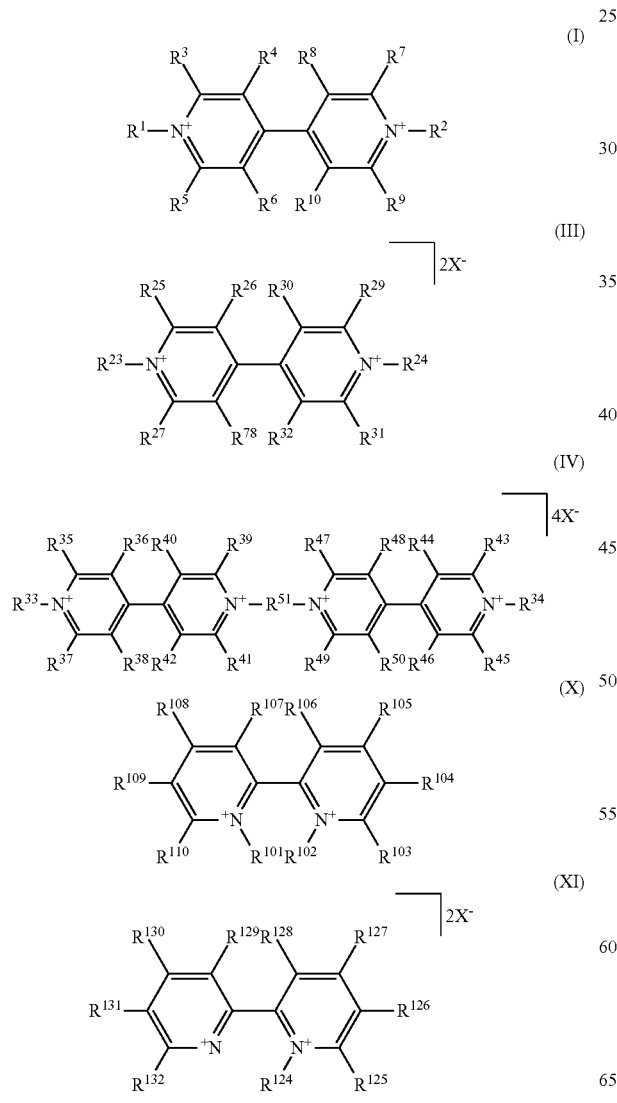

where $R^1$, $R^2$, $R^{101}$, and $R^{102}$ are each independently an alkyl group substituted with a carboxylate, phosphonate, phosphate, or sulfonate;

$R^3$, $R^4$, $R^5$, $R^6$, $R^7$, $R^8$, $R^9$, $R^{10}$, $R^{25}$, $R^{26}$, $R^{27}$, $R^{28}$, $R^{29}$, $R^{30}$, $R^{31}$, $R^{32}$, $R^{35}$, $R^{36}$, $R^{37}$, $R^{38}$, $R^{39}$, $R^{40}$, $R^{41}$, $R^{42}$, $R^{43}$, $R^{44}$, $R^{45}$, $R^{46}$, $R^{47}$, $R^{48}$, $R^{49}$, $R^{50}$, $R^{103}$, $R^{104}$, $R^{105}$, $R^{106}$, $R^{107}$, $R^{108}$, $R_{un}$, $R^{110}$, $R^{125}$, $R^{126}$, $R^{127}$, $R^{128}$, $R^{129}$, $R^{130}$, $R^{131}$, and $R^{132}$ are each independently H, OH, F, Cl, Br, I, CN, $NO_2$, alkyl, alkoxy, or aryl; and $R^{23}$, $R^{24}$, $R^{33}$, $R^{34}$, $R^{123}$, and $R^{124}$ are each independently alkyl, siloxy alkyl, hydroxyalkyl, alkenyl, or aralkyl, or $R^{123}$ and $R^{124}$ taken together are an unsubstituted alkylene;

$R^{51}$ is $(CH_2)_{n'}$ or arylene;

n' is from 1 to 12; and

X is independently at each occurrence an anion; and wherein at least one of the first anodic material and the second anodic material comprises a compound of Formula II, V, VI, or VII:

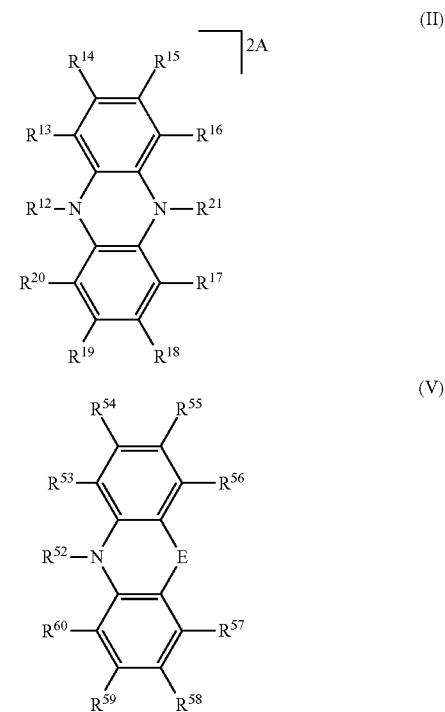

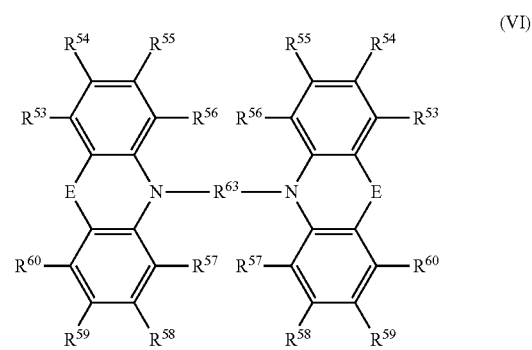

-continued (VII)

where
A is a cation;
E is independently at each occurrence O, S, or $NR^{61}$;
$E^1$ and $E^2$ are each independently O, S, or $NR^{77}$;
$R^{12}$ and $R^{21}$ are each independently an alkyl group substituted with a carboxylate, phosphonate, phosphate, or sulfonate;
$R^{13}$, $R^{14}$, $R^{15}$, $R^{16}$, $R^{17}$, $R^{18}$, $R^{19}$, $R^{20}$, $R^{53}$, $R^{54}$, $R^{55}$, $R^{56}$, $R^{57}$, $R^{58}$, $R^{59}$, $R^{60}$, $R^{67}$, $R^{68}$, $R^{66}$, $R^{70}$, $R^{71}$, $R^{72}$, $R^{73}$, $R^{74}$, $R^{75}$, and $R^{76}$ are each independently H, F, Cl, Br, I, CN, OH, SH, S-alkyl, $NO_2$, alkyl, alkoxy, aryl, or amino, or any two adjacent $R^{13}$, $R^{14}$, $R^{15}$, $R^{16}$, $R^{17}$, $R^{18}$, $R^{19}$, $R^{20}$, $R^{53}$, $R^{54}$, $R^{55}$, $R^{56}$, $R^{57}$, $R^{58}$, $R^{59}$, $R^{60}$, $R^{67}$, $R^{68}$, $R^{69}$, $R^{70}$, $R^{72}$, $R^{73}$, $R^{74}$, and $R^{75}$ join to form a monocyclic, polycyclic, or heterocyclic group;
$R^{52}$, $R^{61}$, $R^{65}$, $R^{66}$, and $R^{77}$ are each independently at each occurrence an alkyl group optionally interrupted by at least one ammonium group; and
$R^{63}$ is an alkylene group.

2. The electrochromic medium of claim 1, wherein the first pair and the at least one of the second anodic material and the second cathodic material are configured to provide a first color upon application of a potential to the electrochromic medium that is less than the absolute value of the first redox potential of the at least one of the second anodic material and the second cathodic material that is electrochromic, and a second color upon application of a potential to the electrochromic medium that is about or above the first redox potential of at least one of the second anodic material and the second cathodic material that is electrochromic.

3. The electrochromic medium of claim 1, wherein an absorption spectrum of the first pair is different than an absorption spectrum of at least one of the second anodic material and the second cathodic material.

4. The electrochromic medium of claim 1, comprising the second anodic material that exhibits a second absorption maxima in the visible range different from the first absorption maxima; wherein
the first anodic material exhibits a first redox potential and a second redox potential, where the absolute value of the second redox potential of the first anodic material is greater than the absolute value of the first redox potential of the first anodic material;
the first anodic material is electrochromic and exhibits the first absorption maxima in the visible range; and
the absolute value of the second redox potential of the first anodic material is greater than the absolute value of the first redox potential of the second anodic material.

5. The electrochromic medium of claim 1, comprising the second cathodic material that exhibits a second absorption maxima in the visible range different from the first absorption maxima; wherein
the first cathodic material exhibits a first redox potential and a second redox potential, where the absolute value of the second redox potential of the first cathodic material is greater than the absolute value of the first redox potential of the first cathodic material;
the first cathodic material is electrochromic and exhibits the first absorption maxima in the visible range; and
the absolute value of the second redox potential of the first cathodic material is greater than the absolute value of the first redox potential of the second cathodic material.

6. The electrochromic medium of claim 1, wherein
the difference between the absolute value of a first redox potential of the first anodic material and the absolute value of a first redox potential of the second anodic material is at least about 110 mV;
the difference between the absolute value of a first redox potential of the first cathodic material and the absolute value of a first redox potential of the second cathodic material is at least about 110 mV.

7. The electrochromic medium of claim 1, wherein the electrochromic medium comprises:
the first pair of the first anodic and the first cathodic material;
a second pair of the second anodic and the second cathodic material;
wherein
a difference between the absolute value of the redox potential of the first pair and the absolute value of the redox potential of the second pair is at least about 110 mV; and
at least one of the second anodic material and the second cathodic material is electrochromic and exhibits a second absorption maxima in the visible range different from the first absorption maxima.

8. The electrochromic medium of claim 7, wherein absorption spectrum of the first pair is different than absorption spectrum of the second pair.

9. The electrochromic medium of claim 1, wherein
a difference between the absolute value of a first redox potential of the first anodic material and the absolute value of a first redox potential of the first cathodic material is no more than about 2000 mV; and
a difference between absolute value of the first redox potential of the second anodic material and the absolute value of the first redox potential of the second cathodic material is no more than about 2000 mV.

10. The electrochromic medium of claim 1, wherein at least one of the first cathodic material and the second cathodic material comprises the compound of Formula I or X.

11. The electrochromic medium of claim 1, wherein at least one of the first cathodic material and the second cathodic material comprises the compound of Formula III, IV, or XI, wherein $R^{23}$, $R^{24}$, $R^{33}$, $R^{34}$, $R^{123}$, and $R^{124}$ are each independently alkyl, siloxy alkyl, hydroxyalkyl, alkenyl, or aralkyl.

12. The electrochromic medium of claim 1, wherein at least one of the first anodic material and the second anodic material comprises the compound of Formula II.

13. The electrochromic medium of claim 1, wherein at least one of the first anodic material and the second anodic material comprises the compound of Formula V or VI.

14. The electrochromic medium of claim 1, wherein at least one of the first anodic material and the second anodic material.

15. The electrochromic medium of claim 1, wherein the solvent comprises a carbonate, a halogenated solvent, an ether, an ester, a ketones, an tertiary amide, a nitrile, a sulfoxide, a sulfone, or a mixture of any two or more thereof.

16. The electrochromic medium of claim 1, wherein electrochromic medium is a solid state, solution phase, a gel, an electrochromic thermoplastic, or a cross-linked material.

17. The electrochromic medium of claim 1, wherein the electrochromic medium is substantially transparent absent application of a potential.

18. An electrochromic device comprising: the electrochromic medium of claim 1; and a chamber defined by a first conductive surface of first substrate, a second conductive surface of a second substrate, and a sealing member joining the first substrate to the second substrate, wherein the electrochromic medium is disposed within the chamber.

19. The electrochromic device of claim 18 which is an electrochromic window, an electrochromic sun visor, an electrochromic sun roof, or an electrochromic mirror.

* * * * *